April 29, 1969 D. R. BARBER ET AL 3,441,866
AMPLIFIER REGULATION
Filed May 10, 1967
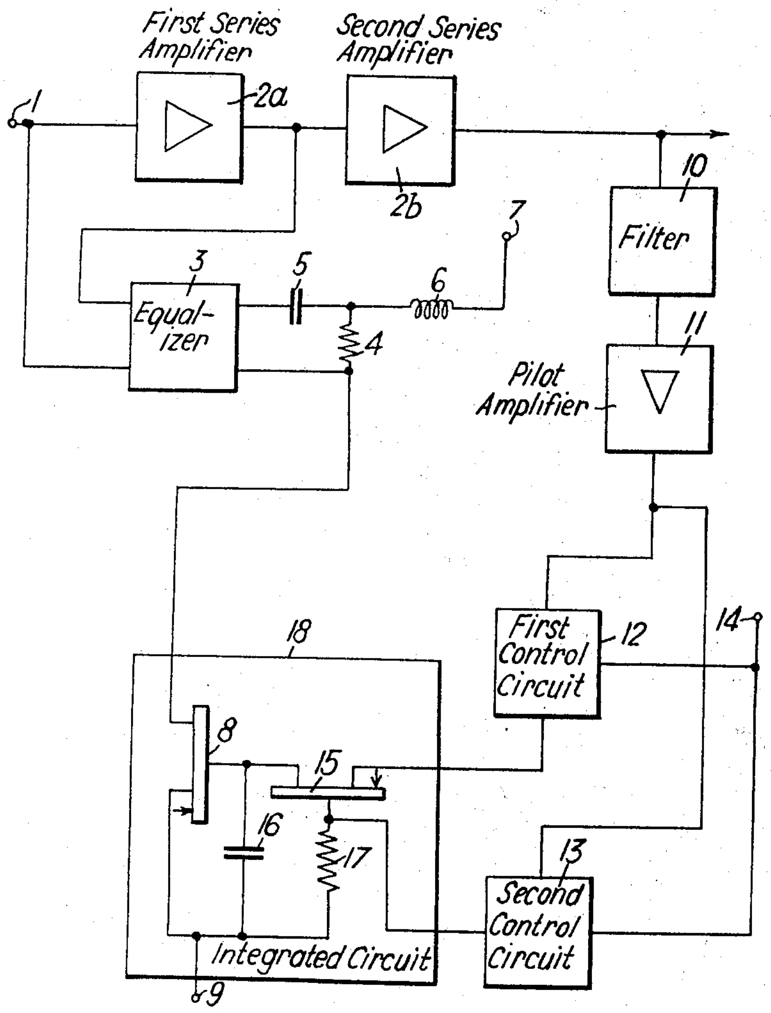

United States Patent Office 3,441,866
Patented Apr. 29, 1969

3,441,866
AMPLIFIER REGULATION

Donald Robert Barber, Bishop's Stortford, and Richard Alfred Nye, Woodside, Thornwood Common, Essex, England, assignors to International Standard Electric Corporation Filed May 10, 1967, Ser. No. 637,416
Claims priority, application Great Britain, May 13, 1966, 21,299/66
Int. Cl. H03g *3/30;* H03f *3/66*
U.S. Cl. 330—29 9 Claims

ABSTRACT OF THE DISCLOSURE

A gain control circuit for repeater amplifiers. An insulated gate field effect transistor (IGFET) is used in the feedback loop between a pilot signal level detector and a variable equalizing network for the repeater. A second IGFET is normally conducting so as to allow the pilot signal level to be applied to one plate of a capacitor and to the gate of the first IGFET whose channel resistance is varied according to the pilot level deviation from a reference level.

In the event of pilot signal or power failure, the second IGFET is cut off, leaving the capacitor charged to the value of the pilot signal immediately prior to cut off. The high gate leakage resistance and drain leakage resistance of the IGFET's provide a memory regulation for the amplifier.

This invention relates to amplifier regulation.

According to the invention there is provided electric regulating equipment for an electric signal handling device having an input and an output, including comparator means for delivering a D.C. voltage output which varies in accordance with any normal variation of the device output level with respect to a reference level, gating means for permitting the output of said comparator means to be simultaneously applied to the gate of a field effect transistor and to one plate of a capacitor during any said normal variation and for cutting off said comparator means output from the gate of the field effect transistor and said capacitor plate during any abnormal variation of the device output level with respect to said reference level so as to leave the capacitor plate charged to the level of the comparator means output immediately prior to said cut off, and regulator means including the source and drain of said field effect transistor for compensating the input level to said device during normal device output conditions in accordance with any said normal variation of the device output level and during abnormal device output conditions in accordance with the level immediately prior to said cut off.

Equipment embodying the invention will now be described with reference to the accompanying drawing, which shows a schematic circuit diagram of coaxial repeater equipment of an eletrical communication system. The communication system is a carrier telephony system in which a pilot signal is transmitted for the purpose of indicating the characteristics of the transmission path between a transmitter and a receiver.

In systems of this type, it is desirable that should the pilot signal fail for any period, the repeater amplifiers should remain at their last setting until the pilot signal returns to normal. It is also advantageous if the gain setting be remembered in the event of a power failure. This process is called memory regulation.

Referring now to the drawing, modulated carrier signals and the pilot signal are applied via input terminal 1 to series repeater amplifiers *2a* and *2b* which control the signal level output to a desired value in accordance with the loss insertion of a variable equaliser network 3. The network loss is determined by the resistance of a directly heated thermistor 4.

The thermistor 4 is connected to the network 3 via a D.C. blocking capacitor 5, via a signal blocking inductance 6 to a D.C. terminal 7, and via the source and drain of insulated gate field effect transistor 8 to a D.C. terminal 9, the terminals 7 and 8 being at suitable respective potentials derived from the repeater power supply. The value of the current flowing through the thermistor 4 is determined by the channel conductivity of the field effect transistor 8, which in this embodiment has a p-type channel.

The field effect transistor 8 is operated in the enhancement mode, that is with no bias applied to its gate, the field effect transistor 8 is cut off, and the channel conductivity increases with increasing forward bias applied to the gate.

The value of the gate bias is controlled by the pilot signal in the following manner.

The pilot signal, after amplification by the repeater amplifiers *2a* and *2b*, is separated by a filter 10, then amplified and detected by a pilot amplifier 11.

The output from the pilot amplifier 11 is applied both to a first control circuit 12 and to a second control circuit 13. Also applied to both control circuits 12 and 13 is a reference potential from reference terminal 14 connected to the repeater power supply.

The second control circuit 13 delivers an output of one potential under all normal conditions of slow variations in the received pilot signal, but delivers an output of a different potential under abnormal conditions of sudden fluctuation or failure of the received pilot signal.

The output of the second control circuit 13 is applied to the gate of an insulated gate field effect transistor 15, and the normal output of the control circuit 13 is such as to forward bias the field effect transistor 15 to be fully conducting.

The output of the first control circuit 12 is connected via the source and drain of the field effect transistor 15 to the gate of the field effect transistor 8. Under all normal conditions, any variation in the received pilot signal from the reference level causes a corresponding variation in the forward gate bias on the field effect transistor 8. This in turn alters the current flowing through the thermistor 4 and the insertion loss of the network 3, and the gain of the repeater amplifiers is compensated accordingly.

Currently available insulated gate field effect transistors (metal oxide semiconductor field effect transistors) possess a typical gate leakage resistance ($R_{GS}$) of $10^{15}$ ohms and a minimum drain leakage resistance ($R_{DS}$) of $10^{11}$ ohms. Combined with a low leakage capacitor (capacitor 16 typically of 0.3 microforad), it is thus possible to achieve time constants of the order of hours or even days.

In the event of an abnormal pilot signal condition, or a power failure, the output from the second control circuit changes so that the field effect transistor 15 is biased at its gate to be cut-off (zero bias). A resistor 17 (typical value 18 kilohms) is provided so that during the actual process of cutting-off the field effect transistor 15, the charge on its gate leaks away.

The gate of the field effect trainsistor 8 remains charged at the instantaneous bias value just prior to the pilot signal or power failure for a time determined by $R_{DS}$ of the field effect transistor 15, $R_{GS}$ of the field effect transistor 8, and the capacitor 16. $R_{DS}$ of 15 will limit the maximum time constant obtainable as it is generally smaller than $R_{GS}$. This ensures memory regulation referred to earlier. Capacitor 16 provides additional capacity across the gate of the field effect transistor 8 to increase the input time constant.

If required a further similarly operated gating metal oxide semiconductor field effect transistor may be added in series with the field effect transistor 15 for improved isolation of the RC circuit on pilot signal failure. Also, selection of devices for maximum insulating resistance would be advantageous.

It will be appreciated that the function of the field effect transistor 15 is basically to act as an isolating switch in the event of pilot signal or power failure, and accordingly any other suitable form of device may be used to perform the function of being conducting under normal conditions, and non-conducting under abnormal conditions.

The field effect transistor 8, capacitor 16, resistor 17 and field effect transistor 15 (with alternative device and/or any duplication) may be provided in any convenient form of four terminal sealed assembly or integrated circuit, as indicated by being enclosed in square 18.

An indirectly heated thermistor may be used to vary the network insertion loss instead of the described directly heated thermistor, in which case no capacitor 5 and inductance 6 will be required. The thermistor resistive element is connected directly into the network, and the direct current flowing in the separate heater controlled by the field effect transistor 8.

Alternatively, the variable resistance of the channnel of the field effect transistor 8 may directly control the insertion loss of the variable equaliser network, no thermistor then being required.

We claim:

1. Electric regulating equipment for an electric signal handling device having an input and an output, said regulating equipment including comparator means for delivering a D.C. voltage output which varies in accordance with any normal variation of the device output level with respect to a reference level, a field effect transistor, capacitor means associated with said transistor, gating means for enabling the output of said comparator means to be simultaneously applied directly to the gate of said field effect transistor and directly to one plate of said capacitor means during any said normal variation and for cutting off said comparator means output from the gate of the field effect transistor and said capacitor plate during any abnormal variation of the device output level with respect to said reference level so as to leave the capacitor plate charged to the level of the comparator means output immediately prior to said cut off, and regulator means including the source and drain of said field effect transistor for compensating the input level to said device during normal device output conditions in accordance with any said normal variation of the device output level and during abnormal device output conditions in accordance with the level immediately prior to said cut off.

2. The equipment as claimed in claim 1 in which said field effect transistor is an insulated gate field effect transistor.

3. The equipment as claimed in claim 2 in which said gating means comprises a further field effect transistor with the output from said comparator means being applied to the gate of said first field effect transistor via the source and drain of said further field effect transistor, and in which said gating means further comprises control means for applying a first D.C. voltage output to the gate of said further field effect transistor so as to bias the further field effect transistor to be fully conducting during all normal variation of the device output level and for applying a second D.C. voltage output to the gate of said further field effect transistor so as to bias the further field effect transistor to be non-conducting during all abnormal variation of the device output level.

4. The equipment as claimed in claim 3 in which said further field effect transistor is an insulated gate field effect transistor.

5. The equipment of claim 4 in which the field effect transistors and the capacitor form an integrated circuit.

6. The equipment of claim 5 in which said signal handling device is a repeater amplifier, and said comparator means output is derived from a pilot signal output from said amplifier.

7. The equipment of claim 6 in which said regulator means includes a variable loss insertion equalizer network.

8. The equipment of claim 7 in which the variable loss of said network is directly controlled by the channel resistance of the regulator means field effect transistor.

9. The equipment of claim 7 in which the variable loss of said network is directly controlled by a thermistor whose heating current is in turn controlled by the channel resistance of the regulator means field effect transistor.

References Cited

UNITED STATES PATENTS

| | | | |
|---|---|---|---|
| 2,283,241 | 5/1942 | Van Cott | 330—85 X |
| 3,360,748 | 12/1967 | Fish et al. | 330—52 X |

FOREIGN PATENTS

| | | |
|---|---|---|
| 163,760 | 6/1955 | Australia. |

ROY LAKE, *Primary Examiner.*

JAMES B. MULLINS, *Assistant Examiner.*

U.S. Cl. X.R.

330—52, 132, 134, 137, 139, 141